US012782582B2

(12) United States Patent
Reznicek et al.

(10) Patent No.: US 12,782,582 B2
(45) Date of Patent: Nov. 3, 2026

(54) SYSTEM AND METHOD FOR DELTA RANGE MONITOR ENHANCEMENT FOR DETECTING GNSS MULTIPLE SATELLITE FAILURE

(71) Applicant: Honeywell International Inc., Charlotte, NC (US)

(72) Inventors: Radek Reznicek, Zahorovice (CZ); Matej Kucera, Dysina—Nova Hut (CZ); Radek Baranek, Brno (CZ); Karl Abraham Keyzer, Minneapolis, MN (US); Daniel Bertrand, Wayzata, MN (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 264 days.

(21) Appl. No.: 18/614,399

(22) Filed: Mar. 22, 2024

(65) Prior Publication Data

US 2025/0298147 A1 Sep. 25, 2025

(51) Int. Cl.
*G01S 19/47* (2010.01)
*G01S 19/21* (2010.01)

(52) U.S. Cl.
CPC ............ *G01S 19/215* (2013.01); *G01S 19/47* (2013.01)

(58) Field of Classification Search
CPC ............................... G01S 19/215; G01S 19/47
See application file for complete search history.

(56) References Cited

U.S. PATENT DOCUMENTS

| | | | |
|---|---|---|---|
| 5,760,737 | A | 6/1998 | Brenner |
| 6,639,549 | B2 | 10/2003 | Vanderwerf et al. |
| 7,193,559 | B2 | 3/2007 | Ford et al. |
| 9,182,237 | B2 | 11/2015 | Morin et al. |

(Continued)

FOREIGN PATENT DOCUMENTS

EP 4105690 A1 12/2022

OTHER PUBLICATIONS

Clements et al. "Carrier-phase and IMU based GNSS Spoofing Detection for Ground Vehicles", Feb. 28, 2022, arXiv:2203.00140v1, pp. 1 through 13.

(Continued)

*Primary Examiner* — Timothy A Brainard
*Assistant Examiner* — Bongani Jabulani Mashele
(74) *Attorney, Agent, or Firm* — Fogg & Powers LLC

(57) ABSTRACT

A system comprises a GNSS receiver in a vehicle that receives satellite signals from GNSS satellites and produces multiple satellite measurements. An INS in the vehicle communicates with the GNSS receiver and includes inertial sensors that produce inertial measurements for the vehicle. A processor, in communication with the GNSS receiver and the INS, hosts a navigation filter and a spoof detector module in communication with the navigation filter. The spoof detector module includes at least a first spoof detection monitor comprising a delta range monitor. The processor is operative to process the satellite measurements and inertial measurements in the navigation filter to produce a navigation solution. The delta range monitor processes the satellite measurements to detect whether there is a spoof event of the satellite signals received by the GNSS receiver. When a spoof event is detected, GNSS aiding of the INS is disabled and the spoof event is announced.

19 Claims, 6 Drawing Sheets

(56) References Cited

U.S. PATENT DOCUMENTS

| | | | | |
|---|---|---|---|---|
| 9,285,482 | B2 | 3/2016 | Vourc'h et al. | |
| 10,094,930 | B2 | 10/2018 | Schipper et al. | |
| 11,536,850 | B2 * | 12/2022 | Sharma | G01S 19/215 |
| 2016/0377726 | A1 * | 12/2016 | Schipper | G01S 19/215 342/357.59 |
| 2022/0308237 | A1 | 9/2022 | Clausen et al. | |

OTHER PUBLICATIONS

European Patent Office, "Partial European Search Report", dated Aug. 25, 2025, from EP Application No. 25159829.8, from Foreign Counterpart to U.S. Appl. No. 18/614,399, pp. 1 through 15, Published: EP.

Keyzer et al., "GNSS Multiple Satellite Failure Detection Using Solution Separation Measurement Monitoring", U.S. Appl. No. 18/149,604, filed Jan. 3, 2023, pp. 1 through 33, Published: US.

European Patent Office, "Extended European Search Report", dated Nov. 19, 2025, from EP Application No. 25159829.8, from Foreign Counterpart to U.S. Appl. No. 18/614,399, pp. 1 through 13, Published: EP.

* cited by examiner

SYSTEM AND METHOD FOR DELTA RANGE MONITOR ENHANCEMENT FOR DETECTING GNSS MULTIPLE SATELLITE FAILURE

BACKGROUND

As Global Navigation Satellite System (GNSS) jamming and spoofing threats are becoming more prevalent, such threats may impact vehicle operations. While various methods exist for detection of an individual erroneous GNSS satellite measurement, these methods have certain limitations.

For example, some detection methods use GNSS front-end signal monitoring, such as monitoring for an abnormal shape of a correlation signal peak due to overlapping authentic and spoofed signals. Such techniques, however, impose hardware and processing needs on the system that may not be available or possible. Another disadvantage of these methods is that they can only be carried out in the GNSS receiver. Since commercial inertial navigation system (INS) and GNSS solutions are performed in a downstream system, the GNSS front-end signal monitoring is not available.

Other detection methods employ measurement monitoring using a single INS/GNSS solution, in which inconsistencies can potentially be detected. However, a disadvantage is that in some scenarios, these methods cannot determine whether single or multiple measurements may be in error.

Further detection methods utilize a solution separation technique, which is reliant on the assumption that only a single satellite error will be present at a given time. This technique can detect and eventually isolate errors on single satellites. However, when there are detected inconsistencies, the solution separation technique may not be able to differentiate between multiple satellite failures, or a single satellite that is in error but where the error is not large enough to be identified and isolated.

In order to mitigate against GNSS spoofing threats, in which typically most if not all GNSS measurements are impacted and where the measurement set may be self-consistent, there is a need for methods that are able to detect and mitigate against multiple simultaneous erroneous GNSS measurements. Moreover, methods combining inertial and GNSS data to detect multiple satellite failures can lose effectiveness over time when GNSS information is unavailable or not used, and this duration of effectiveness is reduced for lower performing inertial sensors.

SUMMARY

A system comprises a GNSS receiver in a vehicle, the GNSS receiver operative to receive a plurality of satellite signals from multiple GNSS satellites and produce multiple satellite measurements. An INS in the vehicle is in operative communication with the GNSS receiver, the INS including one or more inertial sensors operative to produce inertial measurements for the vehicle. At least one processor is in operative communication with the GNSS receiver and the INS, the at least one processor hosting a navigation filter and a spoof detector module in operative communication with the navigation filter, wherein the spoof detector module includes at least a first spoof detection monitor comprising a delta range monitor. The at least one processor is operative to process the satellite measurements from the GNSS receiver, and the inertial measurements from the inertial sensors, in the navigation filter to produce a navigation solution for the vehicle. The delta range monitor is operative to receive and process the satellite measurements from the GNSS receiver to detect whether there is a spoof event of the satellite signals received by the GNSS receiver. When a spoof event is detected, GNSS aiding of the INS is disabled and the spoof event is announced.

BRIEF DESCRIPTION OF THE DRAWINGS

Aspects of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
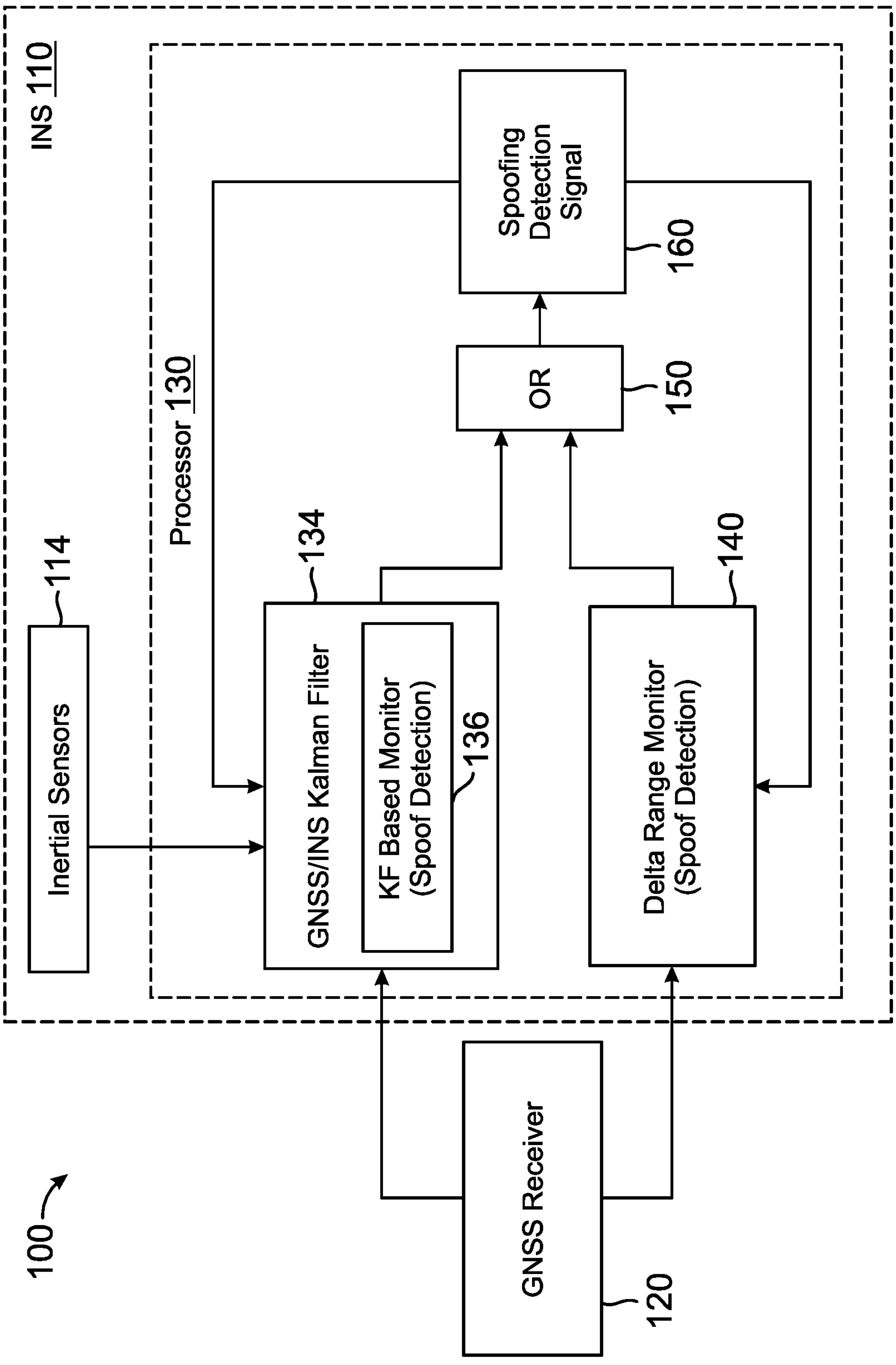
FIG. 1 is a block diagram of a system for detecting failure of multiple navigation satellite signals for an INS/GNSS scheme, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for a delta range monitor enhancement for detecting GNSS multiple satellite failure, which can be used with solution separation measurement monitoring, is described herein.

Pseudoranges and delta ranges are the basic measurements that a GNSS receiver provides and which are consumed by an integrated GNSS/INS device. For example, delta ranges are available on Global Positioning System (GPS) receivers installed on various aircraft that utilize a GPS aided INS. A delta range measurement is derived from the difference in carrier phase over a fixed time interval. Usually, the delta range measurement is treated as an instantaneous velocity measurement in a Kalman filter integration of the GNSS and INS. This is an approximation since the actual measurement is proportional to the integral of the Doppler shift over the delta range integration interval.

As delta ranges are computed from accumulated carrier Doppler (Doppler shift integrated over time from some starting point) and carrier wavelength (e.g., L band carrier wavelength), the delta ranges provide better observability for spoofing detection than GNSS pseudoranges. In addition, using delta ranges brings better observability to step detection instead of using just pseudoranges.

In one approach, a method for spoofing detection and mitigation uses an INS-GNSS spoofing monitor enhanced with a delta range monitor. This approach can prolong spoofing detection in the situation where the INS-GNSS spoofing monitor, such as a Kalman filter based monitor using solution separation measurements, loses detection capability due to a longer spoofing duration.

While a GNSS multiple satellite failure detection method, using solution separation measurement monitoring, may itself be sufficient for high grade inertial systems due to their longer coasting capabilities, there is a need for additional enhancements for lower grade inertial systems. The present approach can provide spoofing detection and mitigation for lower grade inertial systems that use an inertial measurement unit (IMU) with shorter coasting capabilities. This allows lower grade inertial systems to be able to detect the presence of spoofing after losing coasting capability, to prevent aligning a navigation solution to a spoofed signal.

In the present method, monitoring of delta ranges is based on GNSS measurements only, which can be processed even after an IMU loses coasting capability. This method assumes that there is a certain step in delta ranges when switching from a spoofed to a nominal signal, especially if the spoofed signal significantly deviates the targeted vehicle from an actual trajectory.

For smaller position offsets and/or longer exposure times, spoofing detection and mitigation is possible only for some portion of spoofing exposure. This leads to a failure in detection and mitigation over the whole spoofing exposure. The length of spoofing detection and mitigation depends on the magnitude of spoofing offset (transferred into the magnitude of Kalman filter residuals, for example) and IMU performance.

In the example of a Kalman filter residual monitor, this monitor is not sufficient for mitigating spoofing scenarios for a GNSS/INS device that uses a lower performance IMU, in which there is an extended spoofing exposure duration. In this example, after some time (e.g., hundreds of seconds) a Kalman filter residual values drops below a detection threshold and the spoofing is considered as ended. This results in a restart of a navigation filter with initial position aligned to the spoofed trajectory or reincorporation of the GNSS measurements which similarly brings the navigation filter's solution near to the spoofed trajectory. To avoid this result, a delta range monitor is used as an additional spoofing monitor to mitigate against a spoofing attack for such a GNSS/INS device. In this case, the present method holds a spoofing detection flag (alert) for a longer period, so that GNSS aiding is disabled for the whole time of the spoofing attack.

Various methods can be used to detect the start of spoofing, including the present the delta range monitor. The present method can be used in standalone spoofing monitors or in combinations with other techniques in order to prevent false alert detections, as an example. Once the delta range monitor is enabled, it drives the spoofing detection flag (alert) and disables the GNSS aiding in the Kalman filter, even if solution separation measurement monitoring discontinues the spoofing attack detection.

There are various conditions that need to happen before removing the spoofing detection flag (alert). In particular, removing the spoofing detection flag (alert) occurs when the solution separation measurement monitoring is not detecting spoofing, and at least one of the following conditions occurs: outage of delta ranges (outage of GNSS-reacquisition of GNSS signals after spoofing); a step in delta ranges on at least two GNSS satellites (no outage of GNSS signal, smooth transition to nominal GNSS signal); or expiration of a timer of the delta range monitor (used as insurance in case any of the two previous conditions do not occur for a predefined period of time).

Further details of various embodiments are described hereafter and with reference to the drawings.

FIG. 1 is a block diagram of a system 100 for detecting failure of multiple navigation satellite signals for an INS/GNSS scheme, according to one embodiment. The system 100 generally includes an INS 110 for a vehicle, and a GNSS receiver 120 configured to receive satellite signals from multiple GNSS satellites. The INS 110 includes one or more inertial sensors 114, such as an inertial measurement unit (IMU), and is in operative communication with GNSS receiver 120. At least one processor 130 hosts a GNSS/INS Kalman filter 134, which is in operative communication with GNSS receiver 120 and inertial sensors 114.

The GNSS/INS Kalman filter 134 is operatively coupled with a Kalman filter (KF) based monitor 136 for spoof detection. The processor 130 also hosts a delta range monitor 140 for spoof detection, which is in operative communication with GNSS receiver 120. When spoofing is detected, output signals from KF based monitor 136 and/or delta range monitor 140 are sent to a logic OR function 150, which allows the output signals to be used separately or together, to provide a spoofing detection signal 160. The GNSS/INS Kalman filter 134 and delta range monitor 140 are configured to receive spoofing detection signal 160 in respective feedback loops for further processing.

In one operation example of system 100, processor 130 receives satellite measurements from GNSS receiver 120 and inertial measurements from inertial sensors 114, to produce a navigation solution and a plurality of sub-solutions in GNSS/INS Kalman filter 134. In addition, the satellite measurements are directed to delta range monitor 140 from GNSS receiver 120. When a spoof event is detected by KF based monitor 136, GNSS aiding of INS 110 is disabled and spoofing detection signal 160 is produced. If the spoof event persists for at least a predefined number of time periods, delta range monitor 140 is activated and spoofing detection signal 160 is continued, even after KF based monitor 136 loses its detection capability due to a longer spoofing duration. The delta range monitor 140 is deactivated thereafter when one or more of the following conditions occurs: an outage of delta ranges because of reacquisition of a GNSS signal after the spoof event; a step in the delta ranges on at least two GNSS satellites; or expiration of a timer of delta range monitor 140.

Figure 2:
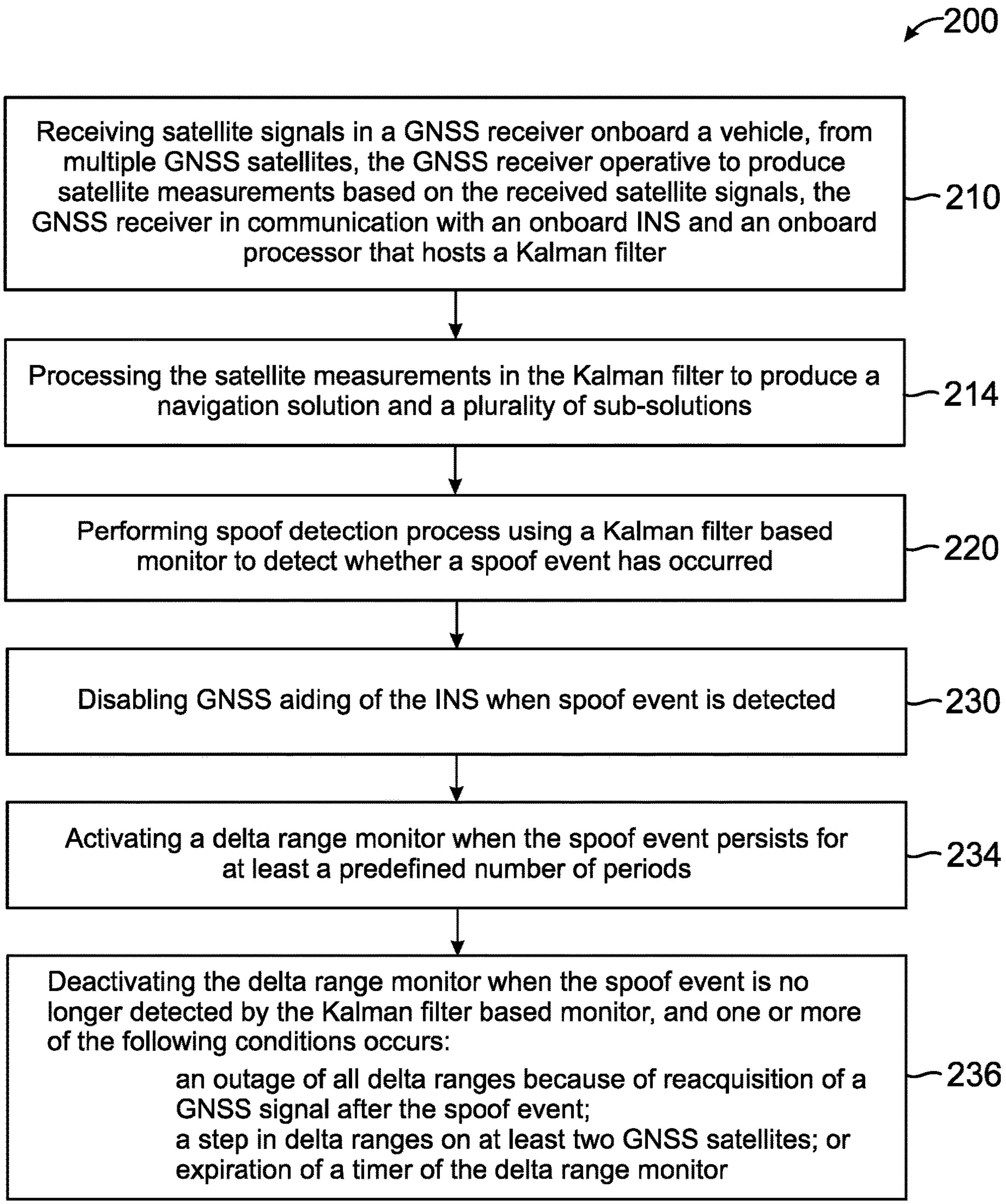
FIG. 2 is a flow diagram of a method for detecting failure of multiple navigation satellite signals in a spoof scenario, according to an exemplary implementation.

FIG. 2 is a flow diagram of a method 200 for detecting failure of multiple navigation satellite signals in a spoof scenario, according to an exemplary implementation. The method 200 comprises receiving a plurality of satellite signals in a GNSS receiver onboard a vehicle, from multiple GNSS satellites, with the GNSS receiver operative to produce multiple satellite measurements based on the received satellite signals, the GNSS receiver in communication with an onboard INS and at least one onboard processor that hosts a Kalman filter (block 210). The method 200 further includes processing the satellite measurements in the Kalman filter to produce a navigation solution and a plurality of sub-solutions (block 214). The method 200 performs a spoof detection process using a Kalman filter based monitor to detect whether a spoof event has occurred (block 220). An example of a Kalman filter spoof detection process, which uses residual monitoring and/or state corrections monitoring, is disclosed in U.S. application Ser. No. 18/149,604, filed on Jan. 3, 2023, entitled GNSS MULTIPLE SATELLITE FAILURE DETECTION USING SOLUTION SEPA- RATION MEASUREMENT MONITORING, the disclosure of which is incorporated by reference herein.

The method 200 proceeds with disabling GNSS aiding of the INS when a spoof event is detected (block 230), and activating a delta range monitor when the spoof event persists for at least a predefined number of periods (block 234). The method 200 deactivates the delta range monitor when the spoof event is no longer detected by the Kalman filter based monitor, and one or more of the following conditions occurs: an outage of delta ranges because of reacquisition of a GNSS signal after the spoof event; a step in delta ranges on at least two GNSS satellites; or expiration of a timer of the delta range monitor (block 236).

Figure 3:
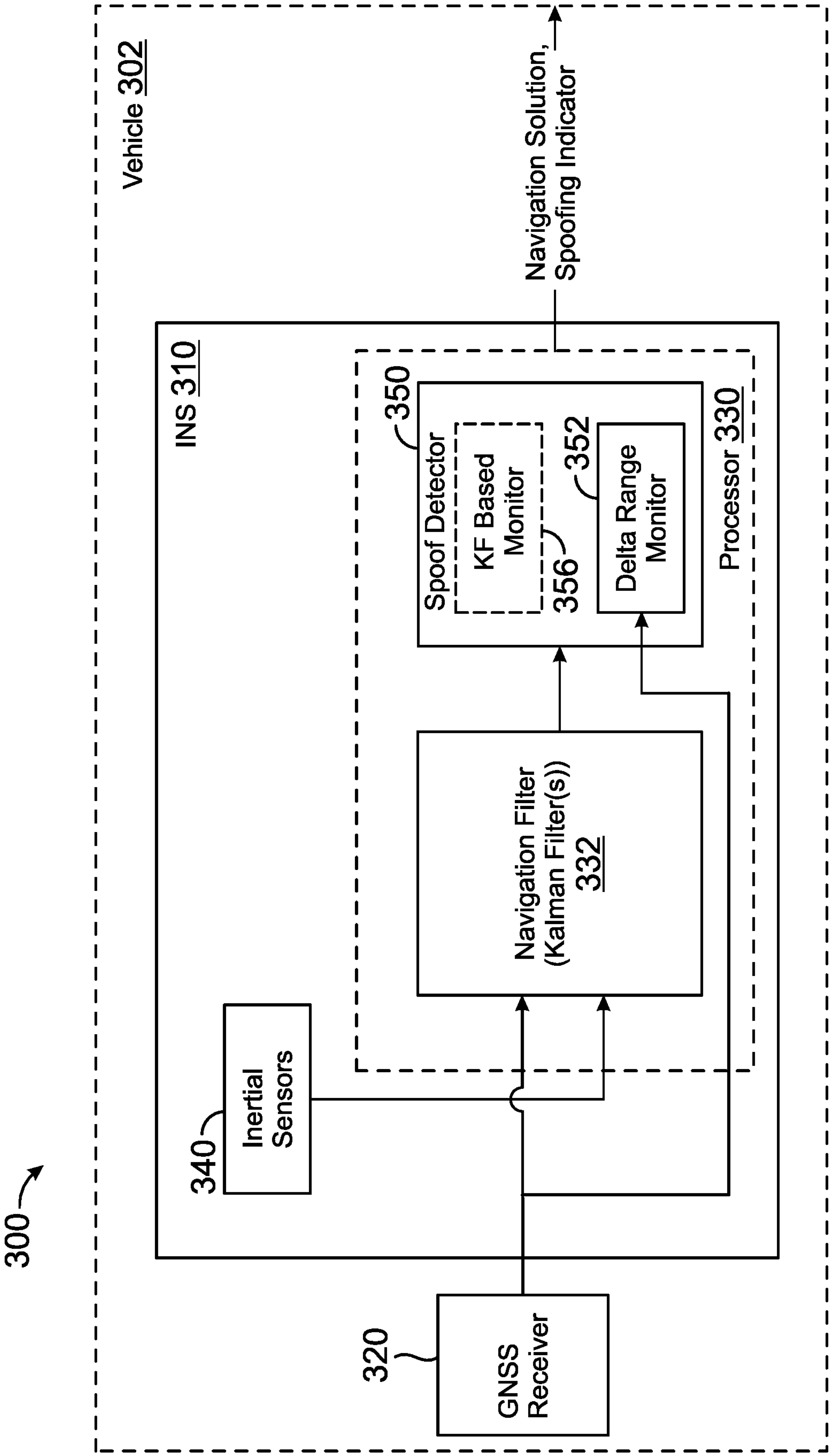
FIG. 3 is a block diagram of a system for detecting failure of multiple navigation satellite signals for a vehicle, according to another embodiment.

FIG. 3 is a block diagram of a system 300 for detecting failure of multiple navigation satellite signals for a vehicle 302, according to another embodiment. The system 300 generally includes an INS 310 in vehicle 302, and a GNSS receiver 320 in vehicle 302 that is configured to receive a plurality of satellite signals from multiple GNSS satellites. The GNSS receiver 320 is operative to produce multiple satellite measurements based on the received satellite signals. The INS 310 is in operative communication with GNSS receiver 320. The vehicle 302 can be a crewed aircraft, an uncrewed aircraft such as an unmanned aircraft systems (UAS) vehicle, an urban air mobility (UAM) vehicle, or the like.

The INS 310 includes at least one processor 330, and one or more inertial sensors 340 such as an inertial measurement unit (IMU). The inertial sensors 340 are operative to produce inertial (e.g., accelerometer and gyroscope) measurements for vehicle 302, which are used by INS 310 to generate estimated kinematic state statistics for vehicle 302. The processor 330 is operative to receive data outputs from GNSS receiver 320 and inertial sensors 340.

The processor 330 hosts at least one navigation filter 332 such as one or more Kalman filters, and a spoof detector module 350, which is operative to detect spoofing of the satellite signals received by GNSS receiver 320. The spoof detector module 350 includes at least a first spoof detection monitor comprising a delta range monitor 352. The spoof detector module 350 can also include an optional second spoof detection monitor that is different from the delta range monitor, such as a KF based monitor 356 (or another spoofing monitor). The delta range monitor 352 and KF based monitor 356 (when present) can be used separately or together, to detect a spoofing event as described further hereafter.

The processor 330 is operative to process the satellite measurements from GNSS receiver 320 and the inertial measurements from inertial sensors 340 in navigation filter 332 to produce a navigation solution and a plurality of sub-solutions. The sub-solutions can be sent to spoof detector module 350 for use by KF based monitor 356 for spoof detections. The processor 330 is operative to output a navigation solution, with a spoofing indicator if a spoof event is detected.

During operation, processor 330 processes satellite measurements from GNSS receiver 320 and inertial measurements from inertial sensors 340 in navigation filter 332 to produce a navigation solution and a plurality of sub-solutions, which are sent to spoof detector module 350. The delta range monitor is operative to receive and process the satellite measurements from the GNSS receiver to detect whether there is a spoof event of the satellite signals received by the GNSS receiver. When a spoof event is detected, GNSS aiding of INS 310 is disabled and the spoofing event is announced to a user.

When KF based monitor 356 is used in conjunction with delta range monitor 352 and a spoof event is detected by KF based monitor 356, the aiding of INS 310 by GNSS receiver 320 is disabled. If the spoof event persists for at least a predefined number of time periods, delta range monitor 352 is activated and the spoofing event is announced to a user. The delta range monitor 352 is deactivated when the spoof event is no longer detected by KF based monitor 356, and at least one of the following conditions occurs: an outage of all delta ranges because of reacquisition of a GNSS signal after the spoof event; a step in the delta ranges on at least two GNSS satellites; or expiration of a timer of delta range monitor 352.

Further details related to operating a KF based monitor enhanced with a delta range monitor for GNSS spoof detection, are described as follows.

Figure 4:
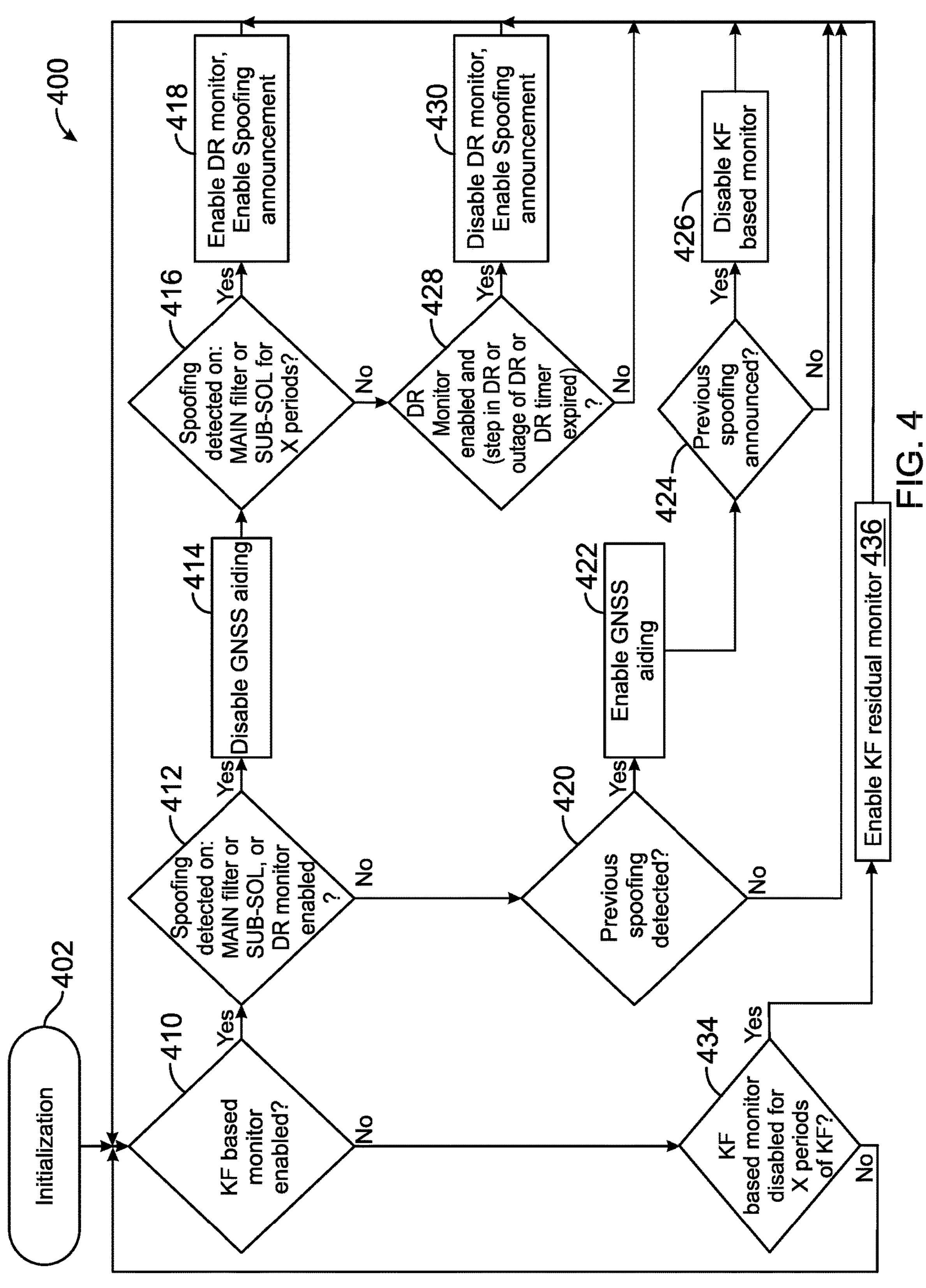
FIG. 4 is a flow diagram of a method for operating a Kalman filter based monitor enhanced with a delta range monitor, according to one implementation.

FIG. 4 is a flow diagram of a method 400 for operating a KF based monitor enhanced with a delta range monitor, according to one implementation. After initialization at 402, method 400 determines whether the KF based monitor is enabled (block 410). If yes, method 400 determines whether spoofing is detected on a main filter or sub-solutions, or if the delta range monitor is enabled (block 412). If yes, method 400 disables GNSS aiding (block 414), and determines whether spoofing is detected on the main filter or sub-solutions for X periods (block 416). Note that parameter X is a configurable (predefined) parameter within the system, with a specific value of X provided to a specific system implementation. If spoofing is detected for X periods, method 400 enables the delta range monitor and enables a spoofing announcement (block 418). The method 400 then repeats starting at block 410.

Returning to block 412, if method 400 determines that spoofing is not detected on the main filter or sub-solutions, and that the delta range monitor is not enabled, then method 400 determines whether previous spoofing was detected (block 420). If yes, method 400 enables GNSS aiding (block 422), and determines whether the detected previous spoofing was announced (block 424). If yes, method 400 disables the KF based monitor (block 426), and method 400 repeats starting at block 410; if no, method 400 repeats starting at block 410. Returning to block 420, if method 400 determines that previous spoofing was not detected, method 400 repeats starting at block 410.

Returning to block 416, if method 400 determines that spoofing is not detected on the main filter or sub-solutions for X periods, then method 400 determines whether the delta range monitor is enabled, and if there is a step in delta ranges, or an outage of delta ranges, or a delta range timer has expired (block 428). If yes, method 400 disables the delta range monitor and disables a spoofing announcement (block 430); if no, method 400 repeats starting at block 410.

Returning to block 410, if method 400 determines that the KF based monitor is not enabled, method 400 determines whether the KF based monitor is disabled for X periods of the Kalman filter (block 434). If yes, method 400 enables the KF based monitor (block 436), and method 400 repeats starting at block 410. Returning to block 434, if method 400 determines that the KF based monitor is not disabled for X periods of the Kalman filter, then method 400 repeats starting at block 410.

Further details of operating a delta range monitor, used in the present approach for GNSS spoof detection, are described as follows.

Figure 5:
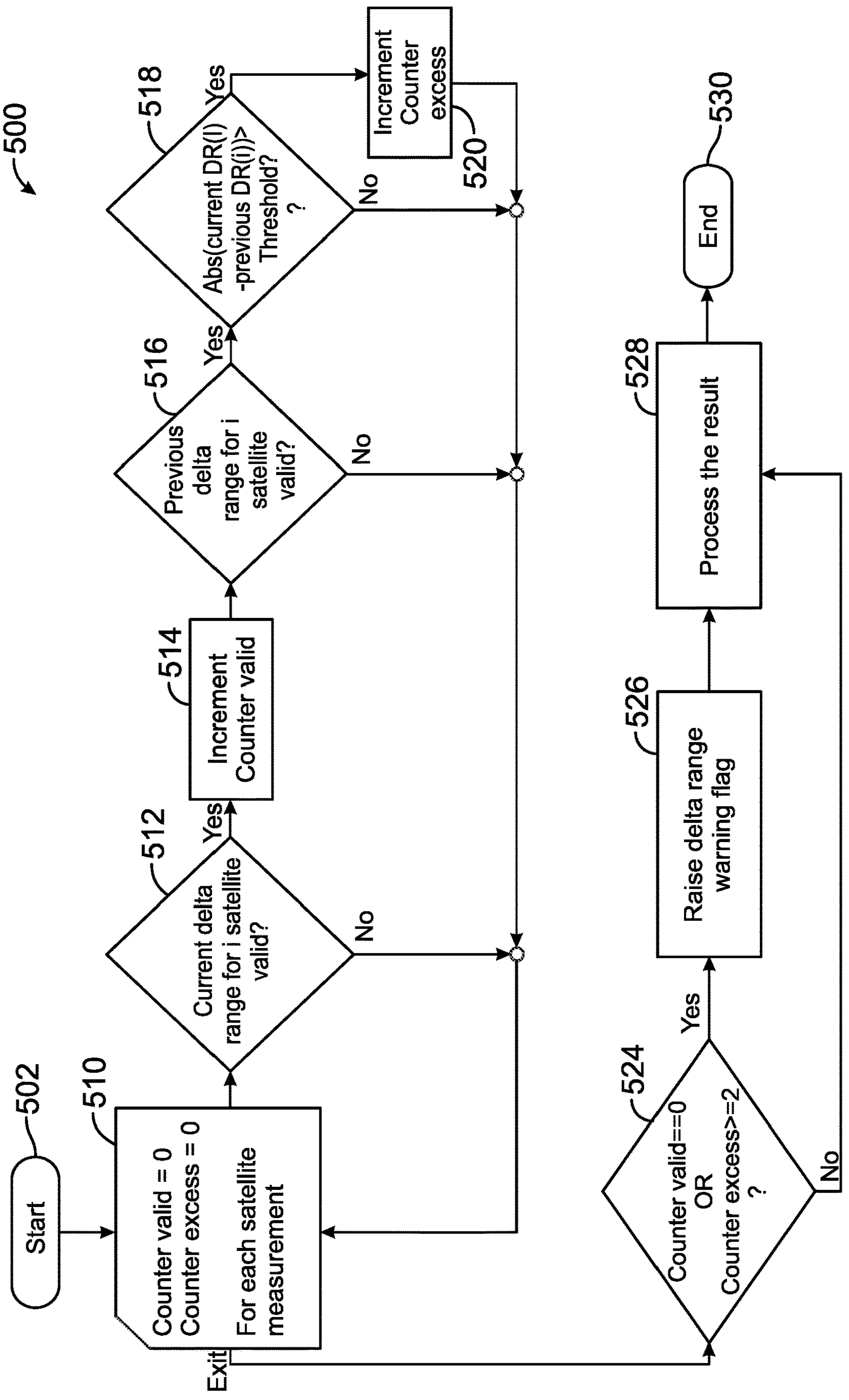
FIG. 5 is a flow diagram of a method for operating a delta range monitor, according to one implementation.

FIG. 5 is a flow diagram of a method 500 for operating a delta range monitor, according to one implementation. Initially, method 500 starts at 502, and sequentially processes each satellite measurement from a GNSS receiver, with a counter valid function equal to zero and a counter excess function equal to zero (block 510). The method 500 sequentially loops through all satellites measurements and checks delta ranges for each satellite measurement using the following process steps.

The method 500 determines whether a current delta range for a given i satellite is valid (block 512). If the current delta range is not valid, method 500 repeats starting at block 510 and continues with a next satellite measurement. If method 500 determines that the delta range for the given i satellite is valid at block 512, then the counter valid function is incremented (block 514). The method 500 then determines whether a previous delta range for the given i satellite is valid (block 516). If the previous delta range is not valid, method 500 repeats starting at block 510 for the next satellite measurement. If method 500 determines that the previous delta range is valid at block 516, then method 500 determines whether an absolute value of a difference between the current delta range (DR) and the previous delta range of the given i satellite is greater than a delta range predefined threshold (block 518). If not, method 500 repeats starting at block 510 for the next satellite measurement. If method 500 determines that an absolute value of the difference between the current delta range and the previous delta range of the given i satellite is greater than the delta range predefined threshold, then the counter excess function is incremented (block 520), and method 500 repeats starting at block 510 for the next satellite measurement.

When the sequential loop process (starting at block 510) of all satellite measurements finishes, method 500 determines whether the counter valid function is still equal to zero, or the counter excess function is greater than or equal to 2 (block 524). If not, method 500 processes this result at block 528. If method 500 determines that the counter valid function is still equal to zero, or that the counter excess function is greater than or equal to 2 (at block 524), then method 500 raises a delta range warning flag (block 526) to announce a spoof event, and processes this result at block 528. The method 500 then ends at 530.

Figure 6:
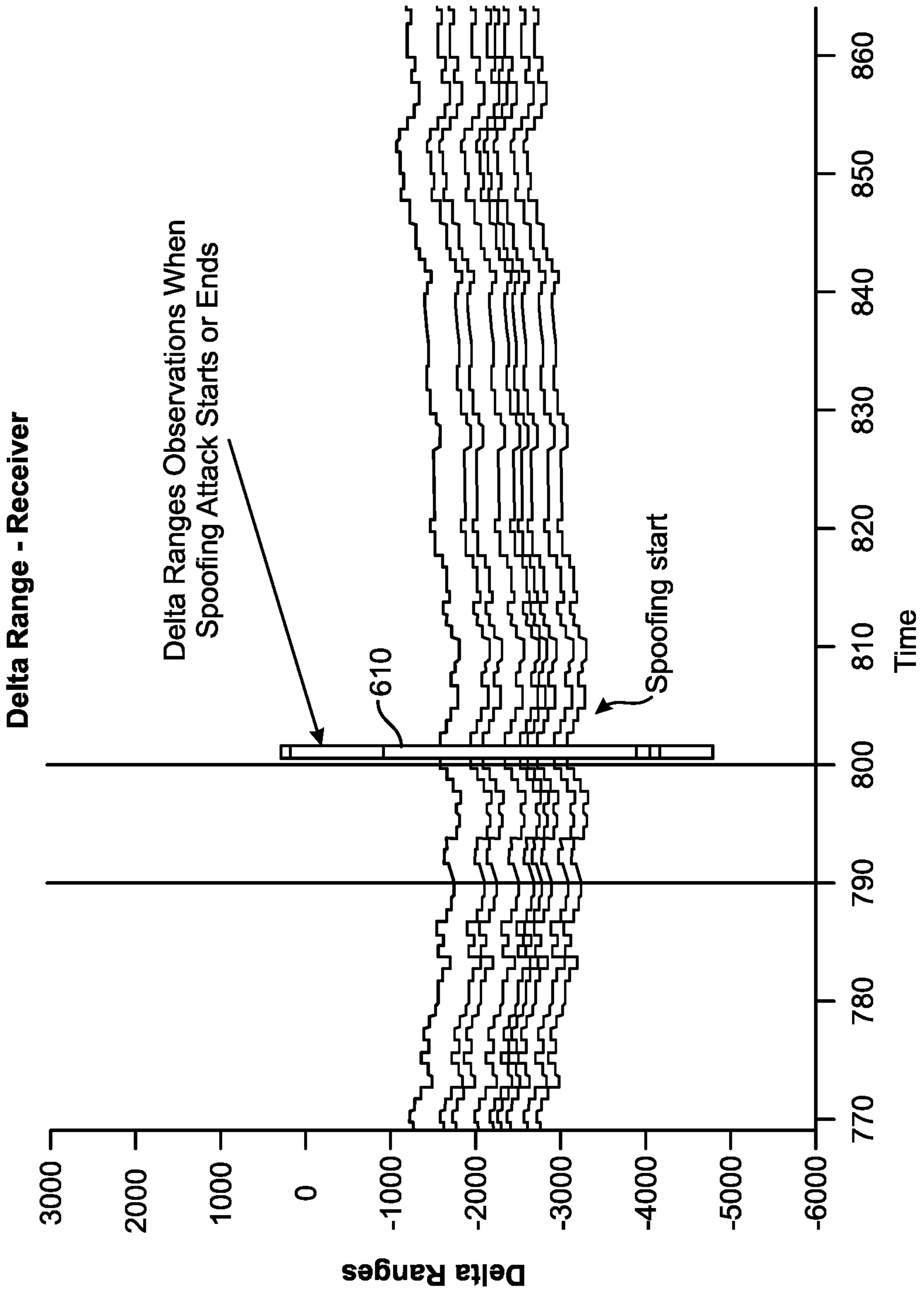
FIG. 6 is a graph of delta ranges from a GNSS receiver with respect to arbitrary time periods, according to one example.

FIG. 6 is a graph showing delta ranges from a GNSS receiver with respect to arbitrary time periods, according to one example. FIG. 6 shows at 610 the delta ranges observations when a spoofing attack starts or ends.

The GNSS delta ranges have an update rate that is typically 1 second, whereas an update rate of a Kalman filter may differ and be longer than 1 second. Thus, it is necessary to utilize the delta range monitor on a GNSS basis (not in Kalman filter) and provide the information from the delta range monitor to the Kalman filter. Based on the delta range monitor, the Kalman filter can disable GNSS aiding of an INS even if a KF based monitor stops detecting the spoofing event.

The one or more processors and/or other computational devices used in the methods and systems described herein may be implemented using software, firmware, hardware, or appropriate combinations thereof. The processors and/or other computational devices may be supplemented by, or incorporated in, specially-designed application-specific integrated circuits (ASICs) or field programmable gate arrays (FPGAs). In some implementations, the processors and/or other computational devices may communicate through one or more transceivers with other computing devices outside of the navigation system, such as those associated with a management system or computing devices associated with other subsystems controlled by the management system. The processors and/or other computational devices can also include or function with software programs, firmware, or other computer readable instructions for carrying out various process tasks, calculations, and control functions used in the method and system described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer or processor readable storage media may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: a global navigation satellite system (GNSS) receiver in a vehicle, the GNSS receiver operative to receive a plurality of satellite signals from multiple GNSS satellites and produce multiple satellite measurements; an inertial navigation system (INS) in the vehicle and in operative communication with the GNSS receiver, the INS including one or more inertial sensors operative to produce inertial measurements for the vehicle; and at least one processor in operative communication with the GNSS receiver and the INS, the at least one processor hosting a navigation filter and a spoof detector module in operative communication with the navigation filter, wherein the spoof detector module includes at least a first spoof detection monitor comprising a delta range monitor; wherein the at least one processor is operative to process the satellite measurements from the GNSS receiver and the inertial measurements from the inertial sensors in the navigation filter to produce a navigation solution for the vehicle; wherein the delta range monitor is operative to receive and process the satellite measurements from the GNSS receiver to detect whether there is a spoof event of the satellite signals received by the GNSS receiver; wherein when a spoof event is detected, GNSS aiding of the INS is disabled and the spoof event is announced.

Example 2 includes the system of Example 1, wherein the spoof detector module further comprises a second spoof detection monitor that is different from the delta range monitor; wherein when a spoof event is detected by the second spoof detection monitor, and the spoof event persists for at least a predefined number of periods, the delta range monitor is activated; wherein the delta range monitor is deactivated when the spoof event is no longer detected by the second spoof detection monitor, and at least one condition occurs comprising: an outage of delta ranges because of reacquisition of a GNSS signal after the spoof event; a step in the delta ranges on at least two GNSS satellites; or expiration of a timer of the delta range monitor.

Example 3 includes the system of Example 2, wherein the navigation filter comprises at least one Kalman filter; and the second spoof detection monitor comprises a Kalman filter based monitor.

Example 4 includes the system of any of Examples 1-3, wherein the delta range monitor is operative to perform a method comprising: sequentially processing each satellite measurement from the GNSS receiver by a process comprising: determining whether a current delta range for a given satellite is valid; if the current delta range delta range for the given satellite is valid, then incrementing a counter valid function; determining whether a previous delta range for the given satellite is valid; if the previous delta range for the given satellite is valid, then determining whether a difference between the current delta range and the previous delta range is greater than a delta range threshold; and if the difference between the current delta range and the previous delta range is greater than the delta range threshold, then incrementing a counter excess function.

Example 5 includes the system of Example 4, wherein when each satellite measurement has been sequentially processed, the delta range monitor is further operative to perform a method comprising: determining whether the counter valid function is equal to zero, or the counter excess function is greater than or equal to two; and if the counter valid function is equal to zero, or the counter excess function is greater than or equal to two, then raising a delta range warning flag to announce the spoof event.

Example 6 includes the system of any of Examples 1-5, wherein the one or more inertial sensors comprises an inertial measurement unit (IMU).

Example 7 includes the system of any of Examples 1-6, wherein the vehicle is a crewed aircraft.

Example 8 includes the system of any of Examples 1-6, wherein the vehicle is an uncrewed aircraft.

Example 9 includes the system of any of Examples 1-8, wherein the vehicle comprises an unmanned aircraft systems (UAS) vehicle, or an urban air mobility (UAM) vehicle.

Example 10 includes a method comprising: receiving a plurality of satellite signals in a GNSS receiver onboard a vehicle, from multiple GNSS satellites, the GNSS receiver operative to produce multiple satellite measurements based on the received satellite signals, the GNSS receiver in communication with an onboard INS and at least one onboard processor that hosts a Kalman filter; processing the satellite measurements in the Kalman filter to produce a navigation solution and a plurality of sub-solutions; performing a spoof detection process using a Kalman filter based monitor to detect whether a spoof event has occurred; disabling GNSS aiding of the INS when a spoof event is detected; activating a delta range monitor when the spoof event persists for at least a predefined number of periods; and deactivating the delta range monitor when the spoof event is no longer detected by the Kalman filter based monitor, and at least one condition occurs comprising: an outage of delta ranges because of reacquisition of a GNSS signal after the spoof event; a step in delta ranges on at least two GNSS satellites; or expiration of a timer of the delta range monitor.

Example 11 includes the method of Example 10, further comprising: determining whether the Kalman filter based monitor is enabled; when the Kalman filter based monitor is enabled, determining whether spoofing is detected in a main filter or sub-solution filters of the Kalman filter, or if the delta range monitor is enabled; when spoofing is detected in the main filter or sub-solution filters, or the delta range monitor is enabled, disabling GNSS aiding of the INS; determining whether the spoofing detected on the main filter or sub-solution filters persists for at least the predefined number of periods; and when the spoofing detected on the main filter or sub-solution filters persists for at least the predefined number of periods, enabling the delta range monitor and providing a spoofing announcement.

Example 12 includes the method of Example 11, wherein when spoofing is not detected on the main filter or sub-solution filters for at least the predefined number of periods, the method further comprises: determining whether the delta range monitor is enabled, and if there is a step in delta ranges, or an outage of delta ranges, or a delta range timer has expired; and when the delta range monitor is enabled, and there is a step in delta ranges, or an outage of delta ranges, or a delta range timer has expired, disabling the delta range monitor and the spoofing announcement.

Example 13 includes the method of any of Examples 11-12, wherein when spoofing is not detected on the main filter or sub-solution filters, or the delta range monitor is not enabled, the method further comprises: determining whether previous spoofing has been detected; when previous spoofing has been detected, enabling GNSS aiding of the INS; determining whether the detected previous spoofing was announced; and if the detected previous spoofing was announced, then disabling the Kalman filter based monitor.

Example 14 includes the method of any of Examples 11-13, wherein when the Kalman filter based monitor is not enabled, the method further comprises: determining whether the Kalman filter based monitor is disabled for at least a selected number of periods of the Kalman filter; and when the Kalman filter based monitor is disabled for at least the selected number of periods of the Kalman filter, enabling the Kalman filter based monitor.

Example 15 includes the method of any of Examples 10-14, wherein the delta range monitor performs a process comprising: sequentially processing each satellite measurement from the GNSS receiver by a process comprising: determining whether a current delta range for a given satellite is valid; if the current delta range for the given satellite is valid, then incrementing a counter valid function; determining whether a previous delta range for the given satellite is valid; if the previous delta range for the given satellite is valid, then determining whether a difference between the current delta range and the previous delta range is greater than a delta range threshold; and if the difference between the current delta range and the previous delta range is greater than the delta range threshold, then incrementing a counter excess function.

Example 16 includes the method of Example 15, wherein when each satellite measurement has been sequentially processed, the delta range monitor further performs a process comprising: determining whether the counter valid function is equal to zero, or the counter excess function is greater than or equal to two; and if the counter valid function is equal to zero, or the counter excess function is greater than or equal to two, then raising a delta range warning flag to announce the spoof event.

Example 17 includes the method of any of Examples 10-16, wherein the vehicle is a crewed aircraft.

Example 18 includes the method of any of Examples 10-16, wherein the vehicle is an uncrewed aircraft.

Example 19 includes the method of any of Examples 10-18, wherein the vehicle comprises an unmanned aircraft systems (UAS) vehicle, or an urban air mobility (UAM) vehicle.

Example 20 includes a program product comprising: a processor readable medium having instructions stored thereon, executable by at least one processor, to perform a method for detecting failure of multiple navigation satellite signals, the method comprising: receiving a plurality of satellite signals in a GNSS receiver, from multiple GNSS satellites, the GNSS receiver operative to produce multiple satellite measurements based on the received satellite signals, the GNSS receiver in communication with an INS and a Kalman filter; processing the satellite signals in the Kalman filter to produce a navigation solution and a plurality of sub-solutions; performing a spoof detection process using a Kalman filter based monitor to detect whether a spoof event has occurred; disabling GNSS aiding of the INS when a spoof event is detected; activating a delta range monitor when the spoof event persists for at least a predefined number of periods; and deactivating the delta range monitor when the spoof event is no longer detected by the Kalman filter based monitor, and at least one condition occurs comprising: an outage of delta ranges because of reacquisition of a GNSS signal after the spoof event; a step in delta ranges on at least two GNSS satellites; or expiration of a timer of the delta range monitor.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:

a global navigation satellite system (GNSS) receiver in a vehicle, the GNSS receiver operative to receive a plurality of satellite signals from multiple GNSS satellites and produce multiple satellite measurements;

an inertial navigation system (INS) in the vehicle and in operative communication with the GNSS receiver, the INS including one or more inertial sensors operative to produce inertial measurements for the vehicle; and at least one processor in operative communication with the GNSS receiver and the INS, the at least one processor hosting a navigation filter and a spoof detector module in operative communication with the navigation filter, wherein the spoof detector module includes at least a first spoof detection monitor comprising a delta range monitor;

wherein the at least one processor is operative to process the satellite measurements from the GNSS receiver and the inertial measurements from the inertial sensors in the navigation filter to produce a navigation solution for the vehicle;

wherein the delta range monitor is operative to receive and process the satellite measurements from the GNSS receiver to detect whether there is a spoof event of the satellite signals received by the GNSS receiver, wherein the delta range monitor is operative to sequentially process each satellite measurement from the GNSS receiver by a process comprising:

determining whether a current delta range for a given satellite is valid;

if the current delta range for the given satellite is valid, then incrementing a counter valid function;

determining whether a previous delta range for the given satellite is valid;

if the previous delta range for the given satellite is valid, then determining whether a difference between the current delta range and the previous delta range is greater than a delta range threshold; and if the difference between the current delta range and the previous delta range is greater than the delta range threshold, then incrementing a counter excess function;

wherein when a spoof event is detected, GNSS aiding of the INS is disabled and the spoof event is announced.

2. The system of claim 1, wherein the spoof detector module further comprises a second spoof detection monitor that is different from the delta range monitor;

wherein when a spoof event is detected by the second spoof detection monitor, and the spoof event persists for at least a predefined number of periods, the delta range monitor is activated;

wherein the delta range monitor is deactivated when the spoof event is no longer detected by the second spoof detection monitor, and at least one condition occurs comprising:

an outage of delta ranges because of reacquisition of a GNSS signal after the spoof event;

a step in the delta ranges on at least two GNSS satellites; or expiration of a timer of the delta range monitor.

3. The system of claim 2, wherein:

the navigation filter comprises at least one Kalman filter; and the second spoof detection monitor comprises a Kalman filter based monitor.

4. The system of claim 1, wherein when each satellite measurement has been sequentially processed, the delta range monitor further performs a method comprising:

determining whether the counter valid function is equal to zero, or the counter excess function is greater than or equal to two; and if the counter valid function is equal to zero, or the counter excess function is greater than or equal to two, then raising a delta range warning flag to announce the spoof event.

5. The system of claim 1, wherein the one or more inertial sensors comprises an inertial measurement unit (IMU).

6. The system of claim 1, wherein the vehicle is a crewed aircraft.

7. The system of claim 1, wherein the vehicle is an uncrewed aircraft.

8. The system of claim 1, wherein the vehicle comprises an unmanned aircraft systems (UAS) vehicle, or an urban air mobility (UAM) vehicle.

9. A method comprising:

receiving a plurality of satellite signals in a Global Navigation Satellite System (GNSS) receiver onboard a vehicle, from multiple GNSS satellites, the GNSS receiver operative to produce multiple satellite measurements based on the received satellite signals, the GNSS receiver in communication with an onboard inertial navigation system (INS) and at least one onboard processor that hosts a Kalman filter;

processing the satellite measurements in the Kalman filter to produce a navigation solution and a plurality of sub-solutions;

performing a spoof detection process using a Kalman filter based monitor to detect whether a spoof event has occurred;

disabling GNSS aiding of the INS when a spoof event is detected;

activating a delta range monitor when the spoof event persists for at least a predefined number of periods; and deactivating the delta range monitor when the spoof event is no longer detected by the Kalman filter based monitor, and at least one condition occurs comprising:

an outage of delta ranges because of reacquisition of a GNSS signal after the spoof event;

a step in delta ranges on at least two GNSS satellites; or expiration of a timer of the delta range monitor.

10. The method of claim 9, further comprising:

determining whether the Kalman filter based monitor is enabled;

when the Kalman filter based monitor is enabled, determining whether spoofing is detected in a main filter or sub-solution filters of the Kalman filter, or if the delta range monitor is enabled;

when spoofing is detected in the main filter or sub-solution filters, or the delta range monitor is enabled, disabling GNSS aiding of the INS;

determining whether the spoofing detected on the main filter or sub-solution filters persists for at least the predefined number of periods; and when the spoofing detected on the main filter or sub-solution filters persists for at least the predefined number of periods, enabling the delta range monitor and providing a spoofing announcement.

11. The method of claim 10, wherein when spoofing is not detected on the main filter or sub-solution filters for at least the predefined number of periods, the method further comprises:

determining whether the delta range monitor is enabled, and if there is a step in delta ranges, or an outage of delta ranges, or a delta range timer has expired; and when the delta range monitor is enabled, and there is a step in delta ranges, or an outage of delta ranges, or a delta range timer has expired, disabling the delta range monitor and the spoofing announcement.

12. The method of claim 10, wherein when spoofing is not detected on the main filter or sub-solution filters, or the delta range monitor is not enabled, the method further comprises:

determining whether previous spoofing has been detected;

when previous spoofing has been detected, enabling GNSS aiding of the INS;

determining whether the detected previous spoofing was announced; and if the detected previous spoofing was announced, then disabling the Kalman filter based monitor.

13. The method of claim 10, wherein when the Kalman filter based monitor is not enabled, the method further comprises:

determining whether the Kalman filter based monitor is disabled for at least a selected number of periods of the Kalman filter; and when the Kalman filter based monitor is disabled for at least the selected number of periods of the Kalman filter, enabling the Kalman filter based monitor.

14. The method of claim 9, wherein the delta range monitor performs a process comprising:

sequentially processing each satellite measurement from the GNSS receiver by a process comprising:

determining whether a current delta range for a given satellite is valid;

if the current delta range for the given satellite is valid, then incrementing a counter valid function;

determining whether a previous delta range for the given satellite is valid;

if the previous delta range for the given satellite is valid, then determining whether a difference between the current delta range and the previous delta range is greater than a delta range threshold; and if the difference between the current delta range and the previous delta range is greater than the delta range threshold, then incrementing a counter excess function.

15. The method of claim 14, wherein when each satellite measurement has been sequentially processed, the delta range monitor further performs a process comprising:

determining whether the counter valid function is equal to zero, or the counter excess function is greater than or equal to two; and if the counter valid function is equal to zero, or the counter excess function is greater than or equal to two, then raising a delta range warning flag to announce the spoof event.

16. The method of claim 9, wherein the vehicle is a crewed aircraft.

17. The method of claim 9, wherein the vehicle is an uncrewed aircraft.

18. The method of claim 9, wherein the vehicle comprises an unmanned aircraft systems (UAS) vehicle, or an urban air mobility (UAM) vehicle.

19. A program product comprising:

a non-transitory processor readable medium having instructions stored thereon, executable by at least one processor, to perform a method for detecting failure of multiple navigation satellite signals, the method comprising:

receiving a plurality of satellite signals in a Global Navigation Satellite System (GNSS) receiver, from multiple GNSS satellites, the GNSS receiver operative to produce multiple satellite measurements based on the received satellite signals, the GNSS receiver in communication with an inertial navigation system (INS) and a Kalman filter;

processing the satellite signals in the Kalman filter to produce a navigation solution and a plurality of sub-solutions;

performing a spoof detection process using a Kalman filter based monitor to detect whether a spoof event has occurred;

disabling GNSS aiding of the INS when a spoof event is detected;

activating a delta range monitor when the spoof event persists for at least a predefined number of periods; and deactivating the delta range monitor when the spoof event is no longer detected by the Kalman filter based monitor, and at least one condition occurs comprising:

an outage of delta ranges because of reacquisition of a GNSS signal after the spoof event;

a step in delta ranges on at least two GNSS satellites; or expiration of a timer of the delta range monitor.

* * * * *